United States Patent
Marion et al.

(10) Patent No.: US 7,031,578 B2
(45) Date of Patent: Apr. 18, 2006

(54) METHOD AND DEVICE FOR PASSIVE ALIGNMENT OF OPTICAL WAVEGUIDES AND OPTOELECTRONIC COMPONENTS AND OPTICAL SYSTEM USING SAID DEVICE

(75) Inventors: François Marion, St Egreve (FR); Eric Jalaguier, Saint Martin D'Uriage (FR); Jean-Charles Souriau, St Egvéve (FR)

(73) Assignee: Commissariate a l'Energie Atomique, Paris (FR)

( * ) Notice: Subject to any disclaimer, the term of this patent is extended or adjusted under 35 U.S.C. 154(b) by 54 days.

(21) Appl. No.: 10/398,964

(22) PCT Filed: Oct. 10, 2001

(86) PCT No.: PCT/FR01/03125

§ 371 (c)(1),
(2), (4) Date: Aug. 21, 2003

(87) PCT Pub. No.: WO02/31565

PCT Pub. Date: Apr. 18, 2002

(65) Prior Publication Data

US 2004/0037507 A1    Feb. 26, 2004

(30) Foreign Application Priority Data

Oct. 11, 2000    (FR) .................................. 00 12993

(51) Int. Cl.
*G02B 6/26*    (2006.01)

(52) U.S. Cl. .............................. 385/52; 385/88; 216/24

(58) Field of Classification Search ................. 385/88, 385/52; 216/24
See application file for complete search history.

(56) References Cited

U.S. PATENT DOCUMENTS 4,217,598 A    8/1980    d'Auria et al.

(Continued)

FOREIGN PATENT DOCUMENTS

EP    0 550 973 A1    7/1993

OTHER PUBLICATIONS

Adrian Keating, et al, "6 Gbit/s Optically Pumped 1.55 um VCSEL Operating Up to 105 C," Department of Electrical and Computer Engineering, Univeristy of CA at Santa Barbara, Santa Barbara.

(Continued)

*Primary Examiner*—Juliana Kang
*Assistant Examiner*—James D. Stein
(74) *Attorney, Agent, or Firm*—Thelen Reid & Priest LLP

(57) ABSTRACT

Given a component comprising at least one active area formed on a substrate and designed to be coupled to a light guide, a support is used, at least one hole is formed in the support starting from one face of this support, this hole being designed to receive one end of the guide, the substrate is fixed to the other face of the support by forming the hole facing the active area if the active area has already been formed, and otherwise it is formed on the substrate facing the hole and the end of the guide is placed in the hole. The optical system is obtained by optically coupling two devices thus obtained.

12 Claims, 4 Drawing Sheets

U.S. PATENT DOCUMENTS

| | | |
|---|---|---|
| 4,309,670 A | 1/1982 | Burnham et al. |
| 4,830,450 A | 5/1989 | Connell et al. |
| 5,305,407 A | 4/1994 | Monroe et al. |
| 5,434,939 A | 7/1995 | Matsuda |
| 6,328,482 B1 * | 12/2001 | Jian ............................ 385/88 |
| 6,550,983 B1 * | 4/2003 | Gilliland et al. .............. 385/93 |
| 6,741,778 B1 * | 5/2004 | Chan et al. ................... 385/52 |

OTHER PUBLICATIONS

Yasuhiro Kobayashi et al., "Improvement of Coupling Efficiency for Passive Alignment of Stacked Multifiber Tapes to a Vertical-Cavity Surface-Emitting Laser Array", Jpn. J. Appl. Phys. vol. 36 (1997), Mar. 1997, pp. 1872-1875.

* cited by examiner

METHOD AND DEVICE FOR PASSIVE ALIGNMENT OF OPTICAL WAVEGUIDES AND OPTOELECTRONIC COMPONENTS AND OPTICAL SYSTEM USING SAID DEVICE

CROSS REFERENCE TO RELATED APPLICATIONS

This application claims priority based on International Patent Application No. PCT/FR01/03125, entitled "Method and Device For Passive Alignment of Light Guides and Optoelectronic Components and Optical System Using This Device" by Francois Marion, et al., which claims priority to French Patent Application Serial No. 00 12993, filed on Oct. 11, 2000.

TECHNICAL FIELD

This invention relates to a method and device for passive alignment of at least one light guide and an optoelectronic component for precision assembly of these elements, and an optical system using this device.

The component may be a photo-detector or a photo-emitter (for example such as a laser or diode).

In particular, the invention can be used to assemble a standard optical fibres ribbon and a module of emission or reception optical circuits.

The invention is also applicable to the connection of an optical fibres matrix to a VCSEL (Vertical Cavity Surface Emitting Lasers) matrix or a matrix of photo-detectors of this type.

The invention is also applicable to optoelectronic components to be assembled to high throughput optical links (for example optical cables fitted with connectors) and to the assembly of "parallel" optical fibres and adjacent optoelectronic components.

STATE OF PRIOR ART

Coupling of an optical fibre and a laser beam emitter requires precise alignment of this component and the fibre, usually within 10 µm or less, the required precision being even greater than for single mode optical fibres. The required precision for coupling an optical fibre and a detector component (for example a VCSEL treated as a photo-detector) is the same as for coupling between the fibre and the emitter component.

Considering the example of coupling of an optical fibre and a laser emitter, one frequently used alignment technique is active alignment of the fibre and this laser emitter, the laser emitter being energised to emit a laser beam. When the alignment is obtained, the fibre is fixed to the laser emitter by welding or bonding.

This active alignment technique introduces a high cost for the resulting assembly.

This is why a passive alignment technique was studied. In this case, the relative position and then the attachment of the fibre and the emitting or receiving element are made without any tension (on the element) or light flux. The fibre and the element are mechanically fixed with respect to each other and are then fixed precisely.

For example, a technique for the passive assembly of an optical fibre and a laser rod is known in which the emission is lateral. This assembly uses a support comprising a V groove designed for positioning the optical fibre. The optical fibre is glued in this V groove and the laser rod is precisely hybridised on the support facing the fibre.

This technique can give precisions of the order of 1 µm to 5 µm. It makes it possible to assemble an optical fibre and a lateral emission laser, but not to assemble a fibre and a VCSEL type laser that emits light through one face.

However, this technique has been modified to enable such an assembly. In this case, optical or mechanical means were used to put the VCSEL 90° from the optical fibre.

Nevertheless, this modified passive alignment technique necessitates the use of complex means, particularly auxiliary alignment means.

If it is desired to assemble a VCSEL strip (emitters or detectors) with optical fibres, prior art shows that it is necessary to use an auxiliary alignment and support means for the assembly.

However, a "direct" assembly of a VCSEL emitting through the back face and an optical fibre is known and described in the following documents:

[1] A. Keating et al., 6 Gbits/s optically pumped 1.55 µm VCSEL operating up to 105° C. Photonics review, vol 12, No. 2, 2000, pp 116–118.

[2] Y. Kobayashi et al., Improvement of coupling efficiency for passive alignment of stacked multifibre tapes to a vertical-cavity surface-emitting laser array, Jpn. J. Appl., Phys., vol 36, Part I, No. 3B, 1997, pp. 1872–1875.

This known assembly is obtained by forming a guide hole in the VCSEL substrate.

As in prior art, the objective with the invention is to solve the problem of direct and precise coupling between at least one light guide (for example an optical fibre) and an optoelectronic component (emitter or detector), for example of the active "planar" type, this coupling being passive, in other words being made when no components are in operation.

To make things clearer, we will consider the particular problem of a direct and precise assembly of a VCSEL and an optical fibre.

Document [1] shows how optical fibres and optoelectronic devices (VCSEL) can be aligned by drilling guide holes in the substrate on which the devices are supported by sliding the optical fibres in these holes.

The fibres and optoelectronic devices can be passively aligned using the assembly thus obtained.

However, this known technique has the disadvantage that guide holes need to be formed directly in the substrate in which these devices are grown.

However, this substrate is made of GaAS and is therefore fragile and can break during manufacture of devices if it is drilled in advance, or could break during the final manufacturing operations of the assembly if the substrate is drilled after the devices have been formed.

Moreover, this GaAs substrate, weakened by the holes, may break while the optical fibres are being inserted.

Furthermore, drilling precise dimensions in a material such as GaAS requires a technique that is not well known and is therefore difficult to implement.

PRESENTATION OF THE INVENTION

The purpose of this invention is to overcome the disadvantages mentioned above.

It proposes that the growth substrate should be transferred onto a support and that holes should be formed on this support, rather than drilling holes directly in this substrate.

This support is preferably made from a strong material, capable of resisting the formation of holes.

Specifically, the purpose of this invention is a method for passive alignment of an optoelectronic component and at least one light guide (for example an optical fibre), the optoelectronic component comprising a substrate, and at least one active area on this substrate that will emit or receive this light and being optically coupled to the light guide, this method being characterised in that:

a support is used with opposite first and second faces, at least one hole is formed in the support, starting from the first face of this support, this hole being designed to receive one end of the light guide, the substrate is fixed to the second face of the support by placing the hole facing the active area if this active area is previously formed on the substrate, and otherwise this active area is then formed on the substrate facing the hole, and the end of the light guide is placed in the hole.

According to one particular embodiment of the method according to the invention, first marks are also formed on the support, the substrate is fixed to the second face of this support and a photolithography technique is then used to form the active area of the optoelectronic component on this substrate, facing the hole, and lithography is done using a mask comprising at least one pattern, this pattern corresponding to the active area to be formed, and also comprising second patterns such that when these second patterns and the first patterns are aligned, the pattern of the mask is aligned with the hole of the support, and this mask is placed above the substrate by aligning the second patterns with the first marks.

Another purpose of this invention is a device for passive alignment of an optoelectronic component and at least one light guide, the optoelectronic component comprising a substrate and at least one active area being formed on this substrate designed to emit or receive this light and that will be optically coupled to the light guide, this device being characterised in that it comprises a support with opposite first and second faces, at least one hole being formed in the support, starting from the first face of this support, this hole being designed to receive one end of the light guide, the substrate being fixed to the second face of the support, the active area being formed or intended to be formed facing the hole.

For example, the support may be made of silicon or corundum.

According to a first particular embodiment of the invention, the hole in the support is a non-through hole and the support is transparent to the light that will be received or emitted by the active area of the optoelectronic component.

According to a second particular embodiment, the support hole opens up onto the second face of this support.

In this case, before the substrate is fixed to the support, a lens can be placed on the end of the hole opening up on the second face of the support.

This invention also relates to an optical system comprising first and second devices conform with the invention and at least one light guide with first and second ends, the first end being placed in the hole of the support of the first device and the second end being placed in the hole of the support of the second device.

For example, a sufficiently short light guide could be used to enable supports belonging to the first and second devices respectively to substantially be in contact with each other.

This light guide may be an optical fibre or a lens.

BRIEF DESCRIPTION OF THE DRAWINGS

This invention will be better understood after reading the description of example embodiments given below, which is given for information purposes only and is in no way limitative, with reference to the attached drawings on which.

DETAILED PRESENTATION OF PARTICULAR EMBODIMENTS

Figure 1:
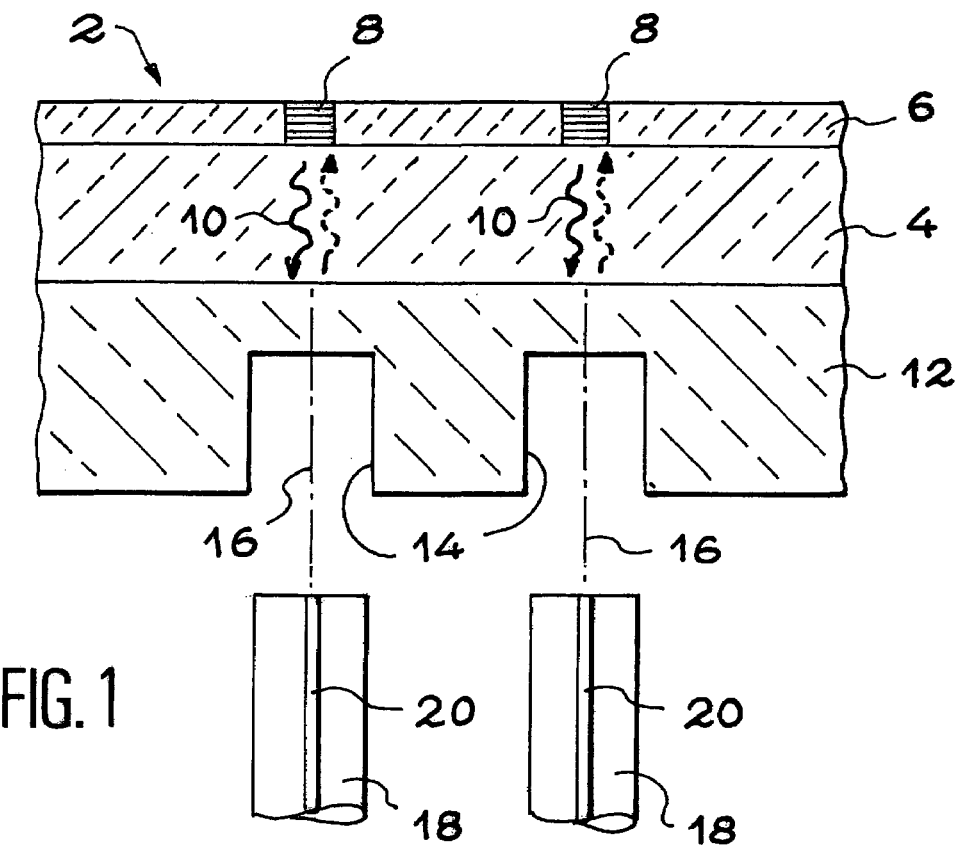
FIGS. 1 and 2 are diagrammatic sectional views of particular embodiments of the device according to the invention, FIGS. 3A to 3D diagrammatically illustrate steps in a particular embodiment of the method according to the invention.

The device according to the invention, which is diagrammatically shown in FIG. 1, comprises an optoelectronic component 2. This component comprises a substrate 4, for example made of GaAs, which forms a growth substrate; an epitaxial layer 6, in which one or several active areas are formed, such as active areas 8, designed to emit or detect light beams 10, is made to grow on this substrate. The substrate 4 is transparent to these beams 10.

The optoelectronic component 2 may have the same nominal thickness that it had during growth of the epitaxial layer 6 and during the formation of the active areas 8, or it may be thinned to a chosen thickness (less than the nominal thickness).

The component 2 emits light to the face opposite the face from which the active areas 8 were formed, or detects lights originating from this opposite face.

The device in FIG. 1 also comprises a support 12 also called the mechanical support, for which one face is fixed on this opposite face. Holes 14 are formed in this support 12 starting from the other face of this support. These holes are formed facing the active areas 8 respectively; the centre line 16 of each hole meets the active area that corresponds to it.

Each hole is designed to receive the end of an optical fibre 18 for which the core is denoted as reference 20 in FIG. 1. This fibre is designed to be coupled to the active area 8 corresponding to the hole in which this fibre is inserted. The diameter of this fibre is very slightly smaller than the diameter of this hole.

In the example in FIG. 1, each hole 14 is a non-through hole; it does not open up onto the face of the support to which the optoelectronic component 2 is fixed. In this case, a support made of a material transparent to light emitted by the active areas 8 or detected by these areas will be chosen.

Figure 2:
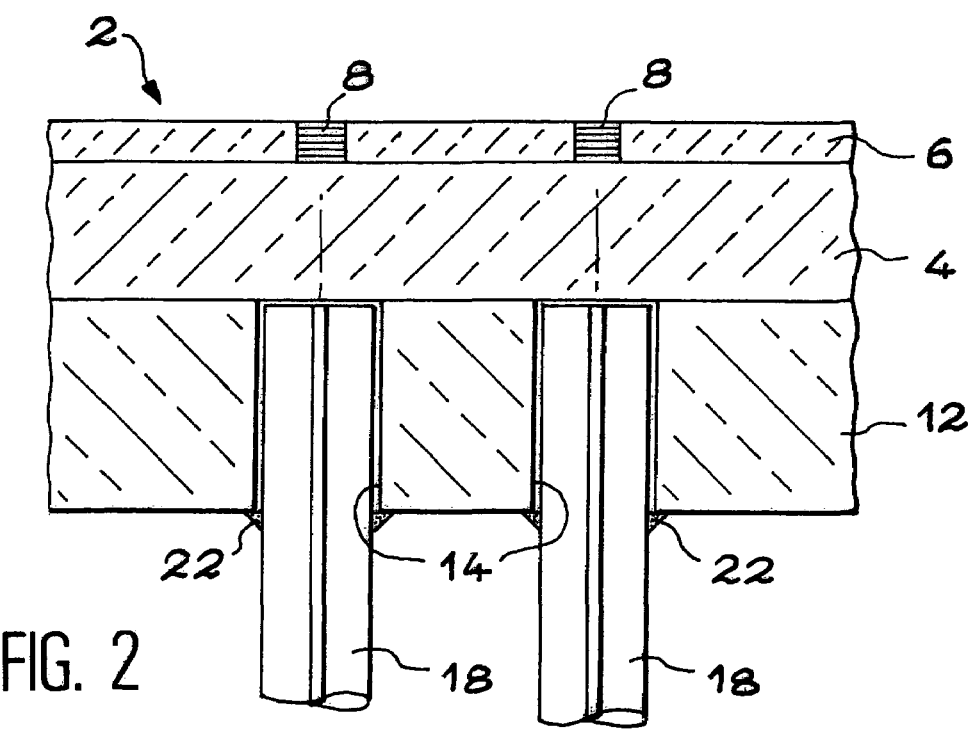

On the other hand, in the example in FIG. 2, the holes 14 are drillings; they open up onto the face of the support 12 that is fixed to the component 2. This FIG. 2 shows the fibres 18 housed in the corresponding holes 14.

A glue layer 22 placed around the periphery of each fibre holds the end of this fibre in the corresponding hole 14.

The examples in FIGS. 1 and 2 show two adjacent optical fibres, but there could be many more optical fibres forming a linear array of optical fibres to be coupled to a linear array, or a two-dimensional array of optical fibres to be coupled to a two-dimensional array, of active areas formed on component 2.

A description will be given later showing how optical fibres and active areas can easily be aligned.

The devices in FIGS. 1 and 2 formed as explained above, are extremely strong if the support material 12 is well chosen, for example made of corundum or silicon. It is preferable to choose a material that is also easy to work and it should be noted that silicon has this quality.

Two advantages of this invention are the strength of the component-mechanical support assembly and the ease of drilling this support with the required precision (usually ±1 µm) or the required shapes (for example cylindrical or conical).

Concerning the strength of the assembly, it should be noted that this assembly may be formed before or after the formation of the active areas 8.

This assembly can be formed before these active areas, by placing the substrate 4 of the optoelectronic component 2 on the mechanical support 12 before forming active areas 8. The assembly thus formed means that the substrate 4 can be very strong during formation of the areas 8, preventing any breakage problem, which arises with standard growth substrates made for example of GaAs or InP.

The assembly can be formed after the active areas 8 by placing the substrate 4 (usually in the form of a board) on the mechanical support 12 after having formed the areas 8. The assembly thus formed is very strong during assembly operations, such as when transferring the assembly onto a ceramic board and during placement of the optical fibres.

Considering the ease of drilling the mechanical support, we will consider the example of a silicon support.

It is known that this material is used to make MEMS (micro-electro-mechanical system) assemblies. Therefore, drilling of the silicon is perfectly controlled and there are many techniques and machines for obtaining a board forming the mechanical support as it was defined.

Complementary elements can also be formed in the silicon (for example collimation lenses at the bottom of guide holes 14) that can confer an active optoelectronic role to this material.

FIGS. 3A to 3D diagrammatically illustrate the steps in a particular embodiment of the invention, in which the silicon board 12 with holes 14 passing through this board 12 can be glued to the optoelectronic component 2, before formation of the active areas 8 (emitting or receiving).

Figure 3:
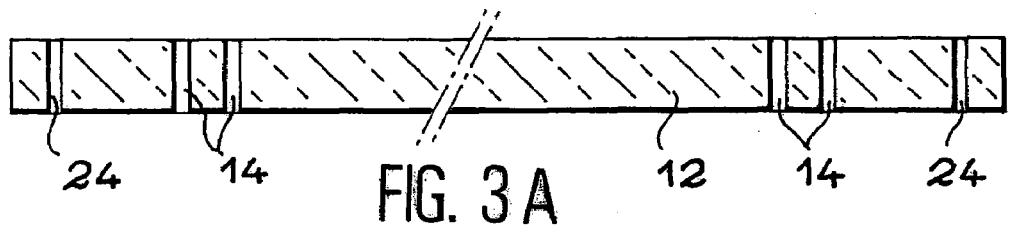
Figure 3:
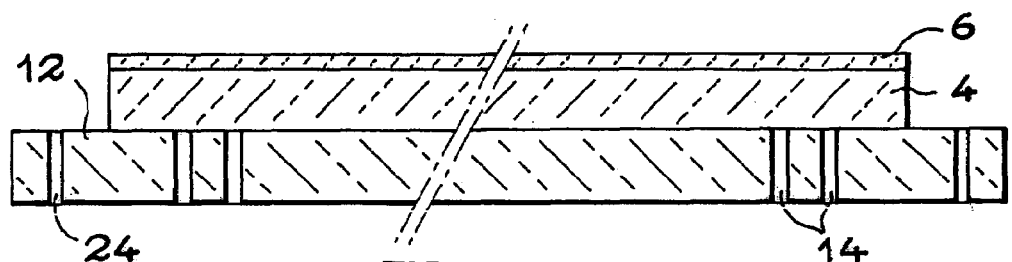
Figure 3:
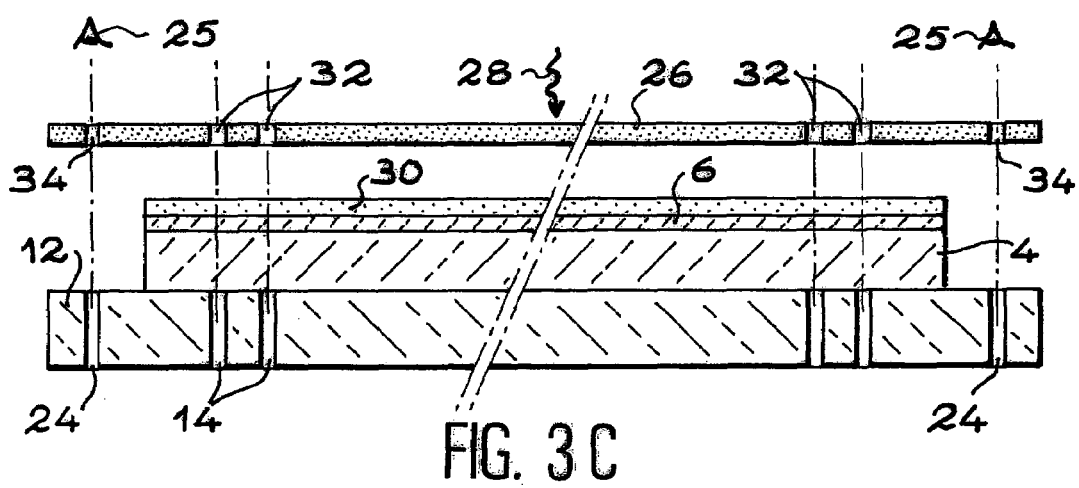
Figure 3:
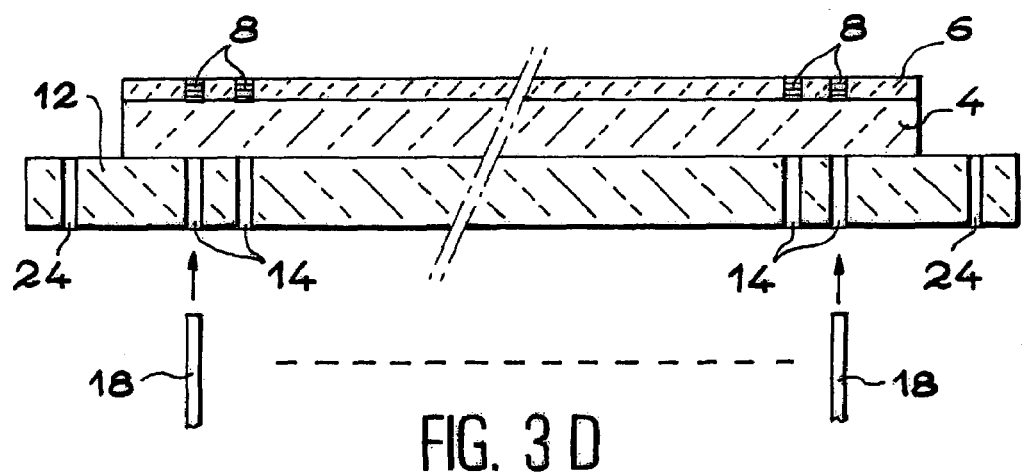

FIG. 3A shows the silicon board 12 in which the holes 14 or the fibre cavities were formed, for example by chemical etching or plasma engraving or mechanical machining. One of these techniques was also used to form marks or alignment marks 24 in this board on each side of the set of holes 14, for example consisting of drillings identical to the through holes 14.

Note that it would also be possible to use this type of drilling 24 as marks with non-through holes 14.

FIG. 3B illustrates the transfer and bonding of the substrate 4, for example made of GaAs (and with the epitaxial layer 6), on the drilled silicon board 12 forming the mechanical support.

For example, bonding may be molecular bonding or eutectic bonding or bonding done using an appropriate adhesive layer (not shown).

FIG. 3C diagrammatically illustrates a first alignment level; a photolithography mask 26 (symbolised by the eyes 25) is aligned on the marks 24 (formed outside the bonding area of the substrate 4 to the support 12).

The next step (using ultraviolet radiation and a photoresist layer 30 previously formed on the substrate 4) is photolithography, to align the first level with the holes or cavities of the subjacent fibres 14.

Photolithography enables the formation of active areas 8 (FIG. 3D) facing the holes 14. The mask 26 comprises patterns 32 corresponding to the active areas 8 to be formed, and patterns 34 such that when these patterns 34 are aligned with the 24, the patterns 32 of the mask are aligned with the corresponding holes 14 in the support 12.

FIG. 3D diagrammatically illustrates the alignment of active areas 8 that have been formed on the first alignment level. The emitting or receiving patterns making up these areas are thus aligned with very good precision with respect to the fibre cavities 14 (within 1 µm).

The ends of the optical fibres 18 can then be put into place in the corresponding holes 14.

Different variants of the particular embodiment that has just been described with reference to FIGS. 3A to 3D are possible.

In the case considered in which the substrate 4 is transferred onto the support 12 before areas 8 are formed on this substrate, the substrate 4 can for example be thinned before it is transferred and bonded onto the support 12 by molecular bonding.

Complementary elements can also be formed on the silicon before the substrate 4 is bonded to the support 12.

Figure 4:
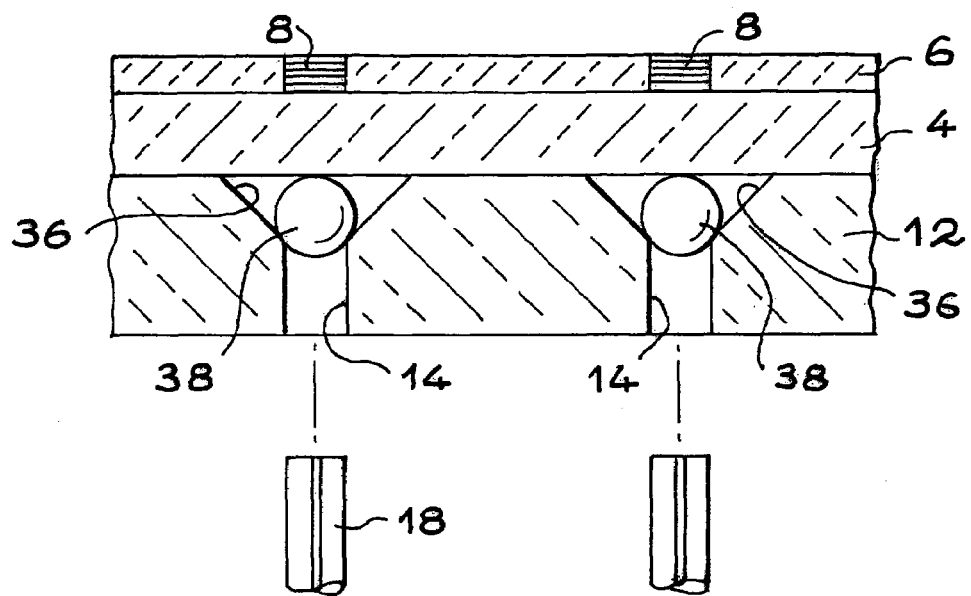
FIG. 4 is a diagrammatic sectional view of another particular embodiment of the device according to the invention.

This possibility is diagrammatically illustrated in FIG. 4 that shows that the end of each hole 14 opening up on the support face is made with a conical shape 36, the support face being glued to the substrate 4, and that the resulting cone contains a spherical collimation lens 38 or a cavity bottom lens with a diameter chosen such that this lens is tangent to the substrate 4 when the substrate is fixed to the support 12.

This would not be possible in the case of direct drilling of the GaAs growth substrate.

The substrate 4 can be transferred onto the support 12 after forming the active areas 8, by using low temperature techniques such as bonding and welding, with machines that enable simultaneous alignment and bonding.

It would be possible to consider making active areas on the back of the optoelectronic component and on the front of the board forming the mechanical support followed by an assembly by solder balls using the flip-chip technique.

Many applications of the invention are possible; this invention can be used to make single fibre optical connectors, matrix optical connectors or fibre tape connectors and direct optical connections between laser emitters and other laser emitters enabling optical pumping of the laser emitters.

The invention thus includes the three-dimensional assembly of optical boards and coupling of these boards by optical fibres.

Figure 5:
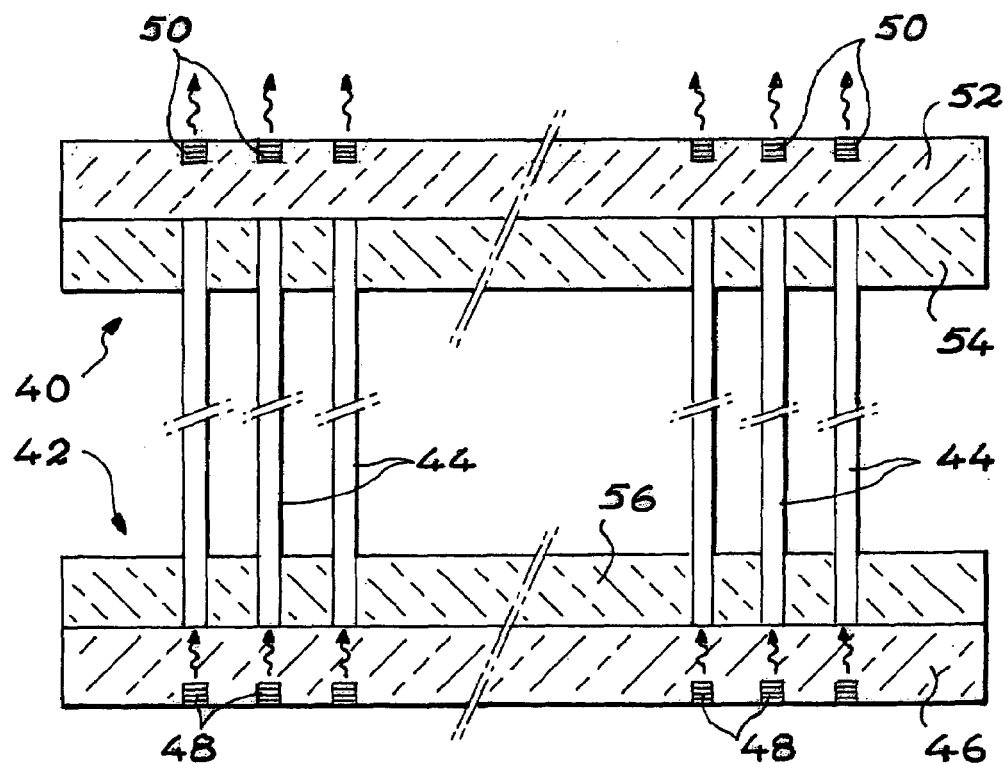
FIGS. 5 to 7 are diagrammatic views of particular embodiments of the optical system according to the invention.

This possibility is diagrammatically shown by the optical system in FIG. 5, comprising a first device 40 and a second device 42 of the type shown in FIG. 2 and coupled to each other through a set of optical fibres 44.

The device 42 forms the lower device and comprises a substrate 46 in which active areas 48 forming VCSELs (vertical cavity surface emitting lasers) have been formed.

These VCSELs operate at 980 nm and emit upwards light flux that passes through the fibres 44. These fibres transmit these fluxes to the active areas 50 of the upper device 40 formed in a substrate 52. These areas are lasers that are excited by these 980 nm incident fluxes and that emit upwards at 1550 nm.

FIG. 5 also shows the mechanical support 54 on which the substrate 52 is bonded, and the support 56 on which the substrate 46 is bonded. The substrates 46 and 52 are transparent to light with a wavelength of 950 nm.

Figure 6:
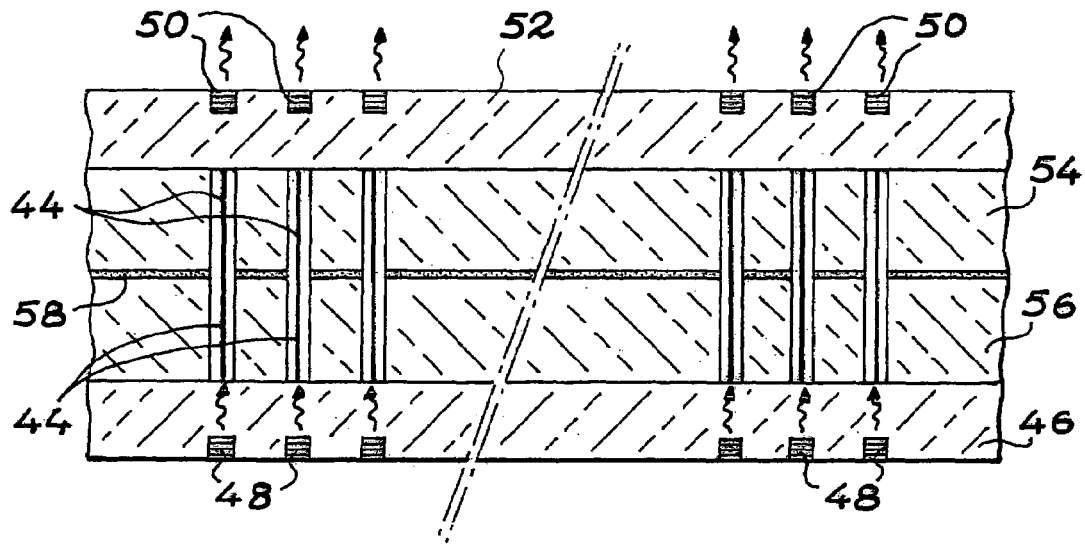

FIG. 6 diagrammatically illustrates the case in which the fibres 44 are short enough to enable the formation of a single piece optical system or in which the supports 54 and 56 are fixed to each other by a layer of glue 58.

Figure 7:
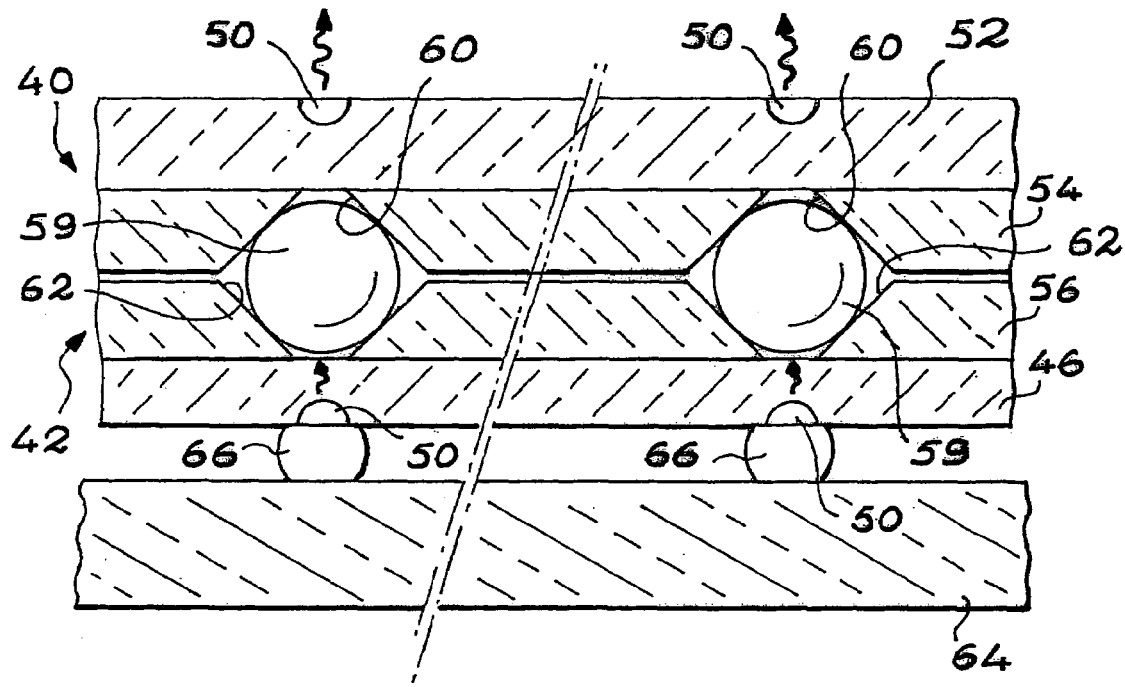

A variant of FIG. 6 is diagrammatically illustrated in FIG. 7. The fibres 44 are replaced by spherical collimation lenses 59.

In the example in FIG. 7, the holes 60 in the mechanical support 54, and the holes 62 in the mechanical support 56 are conically shaped. The lower part of each lens 59 is housed in one of the holes 62, and its upper part is housed in one of the holes 60.

Each lens thus transmits and collimates a light flux emitted from one of the VCSELs 48 to one of the lasers 50.

Conical holes 60 and 62 may be formed by chemical etching. Due to the spherical lenses 59, these holes or cavities can be used to self-align the boards forming the supports 54 and 56, the back face of one of them being in contact with the back face of the other.

The optical system formed by the devices 40 and 42 in FIG. 7 may be installed on a control circuit 64 through micro-solder balls 66.

The invention claimed is:

1. Method for passive alignment of an optoelectronic component and at least one light guide, the optoelectronic component comprising a substrate and, at least one active area on this substrate that will emit or receive this light and being optically coupled to the light guide, method in which:
   a support is used with opposite first and second faces,
   at least one hole is formed in the support, starting from the first face of this support, this hole being designed to receive one end of the light guide,
   the substrate is fixed to the second face of the support, the active area is then formed on the substrate facing the hole, and
   the end of the light guide is placed in the hole,
   this method being characterised in that first marks are also formed on the support, the substrate is fixed to the second face of this support and a photolithography technique is then used to form the active area of the optoelectronic component on this substrate, facing the hole, and photolithography is done using a mask comprising at least one pattern, this pattern corresponding to the active area to be formed, and also comprising second patterns such that when these second patterns and the first marks are aligned, the pattern of the mask is aligned with the hole of the support, and this mask is placed above the substrate by aligning the second patterns with the first marks.

2. Method according to claim 1, in which the support is made of a material chosen from among silicon and corundum.

3. Method according to claim 1, in which the hole in the support is a non-through hole and the support is transparent to the light that will be received or emitted by the active area of the optoelectronic component.

4. Method according to claim 1, in which the support hole opens up onto the second face of this support.

5. Method according to claim 4, in which before the substrate is fixed to the support, a lens is placed on the end of the hole opening up on the second face of the support.

6. Method according to claim 1, in which the light guide is an optical fibre.

7. An optical system comprising first and second devices each of said first and second devices comprising an optoelectronic component and at least one light guide, obtained by the method according to claim 1, the optoelectronic component comprising a substrate and at least one active area being formed on this substrate designed to emit or receive this light and that will be optically coupled to the light guide, this device also comprising a support with opposite first and second faces, at least one hole being formed in the support, starting from the first face of this support, this hole being designed to receive one end of the light guide, the substrate being fixed to the second face of the support, the active area being formed or intended to be formed facing the hole, the system also comprising:
   at least one light guide with first and second ends, the first end being placed in the hole of the support of the first device and the second end being placed in the hole of the support of the second device,
   wherein the light guide is sufficiently short to enable supports belonging to the first and second devices respectively to substantially be in contact with each other.

8. An optical system comprising first and second devices, each of said first and second devices comprising an optoelectronic component and at least one light guide, obtained by the method according to claim 1, the optoelectronic component comprising a substrate and at least one active area being formed on this substrate designed to emit or receive this light and that will be optically coupled to the light guide, this device also comprising a support with opposite first and second faces, at least one hole being formed in the support, starting from the first face of this support this hole being designed to receive one end of the light guide, the substrate being fixed to the second face of the support, the active area being formed or intended to be formed facing the hole, the system also comprising:
   at least one light guide with first and second ends, the first end being placed in the hole of the support of the first device and the second end being placed in the hole of the support of the second device.

9. The system according to claim 8, in which the light guide is sufficiently short to enable supports belonging to the first and second devices respectively to substantially be in contact with each other.

10. The system according to claim 8, in which the light guide is an optical fibre.

11. The system according to claim 8, in which the light guide is a lens.

12. A method for passive alignment of an optoelectronic component and at least one light guide, the optoelectronic component comprising a substrate and, at least one active area on this substrate that will emit or receive this light and being optically coupled to the light guide, comprising:
   a support is used with opposite first and second faces,
   at least one hole is formed in the support, starting from the first face of this support, this hole being designed to receive one end of the light guide,
   the substrate is fixed to the second face of the support, the active area is then formed on the substrate facing the hole, and
   the end of the light guide is placed in the hole,
   this method being characterised in that first marks are also formed on the support, the substrate is fixed to the second face of this support and a photolithography technique is then used to form the active area of the optoelectronic component on this substrate, facing the hole, and photolithography is done using a mask comprising at least one pattern, this pattern corresponding to the active area to be formed, and also comprising second patterns such that when these second patterns and the first marks are aligned, the pattern of the mask is aligned with the hole of the support, and this mask is placed above the substrate by aligning the second patterns with the first marks, and wherein the hole in the support is a non-through hole and the support is transparent to the light that will be received or emitted by the active area of the optoelectronic component.

* * * * *